United States Patent [19]

Harris et al.

[11] Patent Number: 6,038,048
[45] Date of Patent: Mar. 14, 2000

[54] APPARATUS FOR COMMUNICATION BETWEEN MULTIPLE PROCESSING MODULES

[75] Inventors: Jeremy G Harris, Watford; Paul J Garnett, Merseyside, both of United Kingdom

[73] Assignee: Sun Microsystems, Inc., Mountain View, Calif.

[21] Appl. No.: 08/882,465

[22] Filed: Jun. 25, 1997

[51] Int. Cl.[7] .................................................. H04B 10/00
[52] U.S. Cl. .......................................... 359/159; 359/163
[58] Field of Search .................................... 359/159, 154, 359/152, 173, 163; 385/88–89, 92–93

[56] References Cited

U.S. PATENT DOCUMENTS

| | | | |
|---|---|---|---|
| 4,850,044 | 7/1989 | Block et al. | 359/163 X |
| 4,856,091 | 8/1989 | Taska | 359/159 X |
| 5,018,131 | 5/1991 | Shah et al. | 359/159 |
| 5,362,961 | 11/1994 | Hamanaka | 359/163 X |
| 5,818,618 | 10/1998 | Eastmond | 359/159 X |

FOREIGN PATENT DOCUMENTS

| | | | |
|---|---|---|---|
| 39465 | 3/1980 | Japan | 359/159 |
| 5639 | 1/1990 | Japan | 359/163 |

*Primary Examiner*—Thomas Mullen
*Attorney, Agent, or Firm*—Blakely Sokoloff Taylor & Zafman

[57] ABSTRACT

A processing system includes a mechanical support structure and a number of processing modules. Each processing module includes a module connector for mounting the processing module with respect to the support structure and at least one optical transceiver for providing an optical data link between the processing module and a further processing module mounted with respect to the mechanical support structure.

33 Claims, 4 Drawing Sheets

APPARATUS FOR COMMUNICATION BETWEEN MULTIPLE PROCESSING MODULES

BACKGROUND AND INTRODUCTION

The present invention relates to processing systems having multiple processing modules and to processing modules for such processing systems.

In processing systems having multiple processing modules, the multiple processing modules are typically mounted in an array of connectors on a backplane. As well as providing a support structure for the processing modules, the backplane provides communication paths between the processing modules and also to other parts of the processing system. The speed of communication the backplane can provide is limited by its need to serve all of the elements connected via the communication paths.

The invention finds particular application to fault tolerant multi-processor systems, where each processing module forms a replaceable processor module of the system. In such systems, a very high bandwidth is required between the processor modules in order to provide for the exchange of data and control information between the processors to check the operation of the processors and to ensure that they remain in lockstep.

With the continuing increases in processing power of processing systems, the overall performance of such systems is becoming more and more limited by the speed of communication available over such backplane communication paths. Accordingly, it would be desirable if the bandwidth available for communication between processing modules could be increased.

One possible method of increasing the available bandwidth is to increase the clock frequency at which the backplane operates. However, increasing the clock frequency leads to significant additional problems including increased electromagnetic radiation, increased unreliability due to possible timing skew, and so on, as will be apparent to one skilled in the art.

The provision of additional connections over the backplane is typically not possible because all available space for connections via the backplane is already allocated. Increasing the density of pathways also leads to increased unreliability due to manufacturing tolerances and timing problems due to capacitive effects between pathways, for example.

In order to reduce communication delays between processing modules via the backplane, and also to minimise the overall size of the processing system, the individual modules are typically arranged in a tight one or two dimensional array with minimal space between them. Moreover, for reasons of mechanical strength and protection and/or to provide electromagnetic shielding, the modules typically have a substantially cuboidal housing of metal or metallised material. As a result, it would not be practicable to provide further electrical connections between the modules for a number of reasons. For example, there is typically insufficient space between modules securely to make additional connections after mounting of the modules. Also, as the modules could be inserted in different relative dispositions in the array of backplane connectors, the provision of some form of automatic electrical connection would be problematical and unreliable. A further problem where the modules include electromagnetic shielding is that it is typically not possible to have openings or apertures large enough for additional electrical connectors without compromising electromagnetic shielding requirements.

SUMMARY OF THE INVENTION

An aim of the present invention is, therefore, to increase the bandwidth available for communication between processing modules of a multi-module processing system where the modules are electrically connected via a mechanical support structure such as a backplane.

In accordance with a first aspect of the invention, there is provided a processing system comprising a mechanical support structure and a plurality of processing modules, wherein each processing module comprises:

a module connector for mounting the processing module with respect to the support structure; and at least one optical transceiver for providing an optical data link between the processing module and a further processing module mounted with respect to the mechanical support structure.

In accordance with another aspect of the invention there is provided a processing system comprising:

a backplane including a plurality of backplane electrical connectors for an array of processing modules and electrical links between the backplane electrical connectors;

and a plurality of replaceable processing modules mountable on the support structure, wherein each module comprises:

a module electrical connector connectable to a backplane electrical connector when the module is mounted on the backplane;

a plurality of electronic processing components on at least one circuit board;

and a bidirectional optical interface for providing an optical data link between the module and a further module mounted on the backplane.

In accordance with a further aspect of the invention, there is provided a replaceable processing module for a multiple module processing system, the module comprising:

an electrical connector connectable to a corresponding backplane electrical connector on a backplane of the processing system;

a plurality of electronic processing components on at least one circuit board; and a bidirectional optical interface for providing an optical data link between the module and a further module mounted on the backplane.

The invention further provides a method of communicating between processing modules of a multi-processor system having a plurality of processing modules and a mechanical support structure for mounting the processing modules, wherein the method comprises:

mounting a plurality of processing modules with respect to one another by means of the mechanical support structure; and conducting data communication between the processing modules via an optical data link between at least two of the processing modules mounted with respect to one another by means of the mechanical support structure.

Accordingly, the invention provides a solution to the problems described with respect to the prior art by providing for a direct optical data pathway, or link, between processing modules when mounted with respect to the support structure of the processing system.

Reference is made herein to a backplane as a possible support structure. It should be understood that the term backplane is not only intended to cover backplanes of the type where modules are supported on only one side, but is also intended to cover backplanes of the type where modules may be mounted on both sides of the plane.

The optical transceiver or optical interface is located such that the optical transceivers or optical interfaces of respective modules when mounted with respect to the support structure are aligned with each other. In this manner, the optical link can be established simply by mounting and enabling the processing modules.

Preferably, the optical data link is established between modules through free air, so that no direct physical connection is required. This further facilitates the establishment of the optical data link by simple mounting of the modules.

Where a processing module comprises a housing providing electromagnetic shielding, it is only necessary for a small aperture to be provided in the electromagnetic shielding for the optical data path, which aperture can be small enough not to significantly affect the electromagnetic shielding efficiency.

In order for communication to be effected between processing modules which may not be immediately adjacent in the array of processing modules, a processing module can be provided with an optical through-link such that an optical link can be established between non-adjacent modules. This can simply take the form of a through aperture, or could be implemented using an optical waveguide such as an optical cable.

Preferably, the bidirectional optical interface of a module is directly aligned for providing an optical link with a bidirectional optical interface of another module. For example, optical transmitters and/or receivers can be directly mutually aligned.

Alternatively, one end of an optical waveguide (e.g. an optical fibre) can be aligned for providing an optical link with another module and another end can be aligned with an optical transmitter and/or receiver located, for example, on a circuit board of the processing module.

Separate optical waveguides can be provided for transmission and reception, or alternatively, a waveguide can be split.

Typically, the optical data link will be in addition to electrical data links via the backplane, although the optical data links could replace the electrical data links via the backplane. In the latter case, some electrical paths, for example at least for electrical power, will typically still be passed via the backplane. The invention finds particular application to fault tolerant multi-processor systems, where each processing module forms a processor module of the system. Through the use of an embodiment of the invention, very high data rates between processor modules can be achieved in order to provide the exchange of data and control information needed in such systems.

DESCRIPTION OF THE PREFERRED EMBODIMENTS

Figure 1:
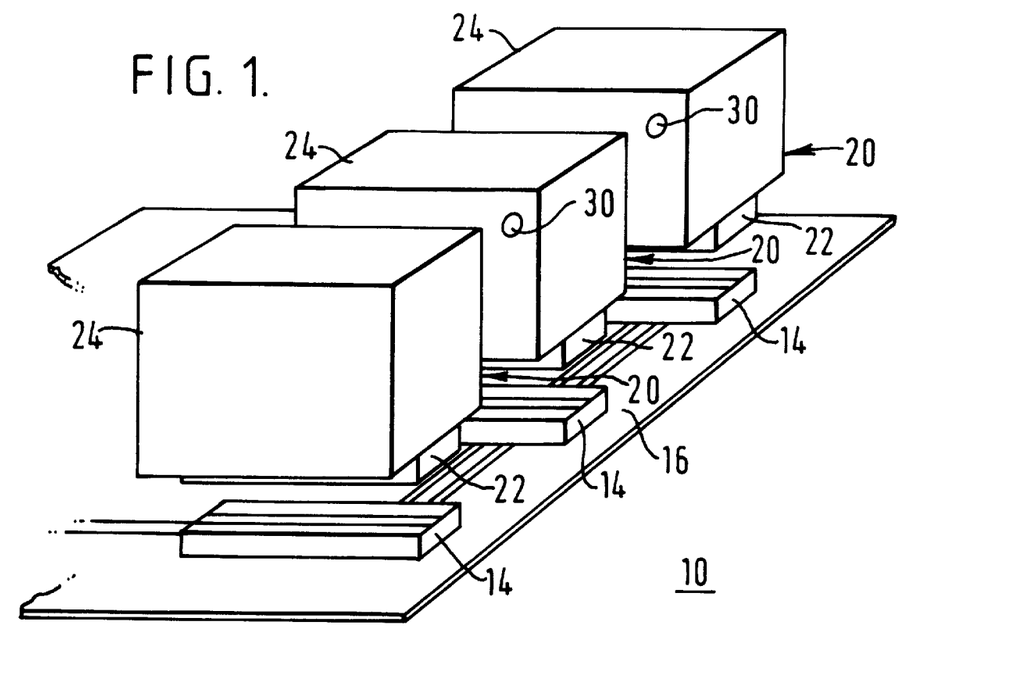
FIG. 1 is a schematic representation of a plurality of modules for connection to a backplane in accordance with an embodiment of the invention.

FIG. 1 is a schematic representation of three modules to be mounted on a backplane in accordance with an embodiment of the invention.

In this embodiment, a multi-processor computer 10 comprises a backplane 12 on which are mounted a plurality of connectors 14 for the attachment of processing modules 20. Individual contacts within the connectors 14 are electrically connected to respective conductive links 16 on the backplane. The conductive links 16 can be thick film circuits, printed circuits, or provided by discrete wiring in a conventional manner. Power and signal connections of required types can be made via the backplane electrical links 16, not only between the connectors 14, but also to other components mounted on or connected to the backplane in a conventional manner. The modules 20 are each provided with a connector 22 for mating with the connector 14 on the backplane. The module connector 22 comprises a plurality of electrical contacts for respective electrical links on, for example, a printed circuit board within the module 20. The electrical links within the module connect various components of the module to each other and to the contacts of the connector 22. The modules are typically, but not necessarily, provided with a housing 24 to provide electromagnetic shielding, to protect the components of the module 20 and also to provide for a robust module. Typically, the modules 20 are intended to be field-replaceable units, and accordingly a robust structure is desirable.

As described in the introduction, the performance of computing systems today is rapidly becoming limited by the bandwidth available for communications between modules. This is a particular problem with multi-processing systems, for example fault-tolerant multi-processing systems, where a significant bandwidth is required for communicating between the individual processing modules for the exchange of data and control information needed in such systems. In FIG. 1, the processing modules 10 form respective processing modules of a fault-tolerant multi-processing system operating in lockstep, although it will be understood that the invention is not limited to such a processing system.

Accordingly, an optical transmitter/receiver arrangement is provided for direct communication between the individual modules bypassing the backplane 12. In a preferred embodiment of the invention where each module 20 is provided with a housing 24, with at least one small aperture 30 being provided in a lateral wall of the housing 24, the aperture 30 can be made very small, due to the use of an optical link, for example of the order of 10 millimeters diameter, or less. A hole of this size does not adversely effect the efficiency of the electromagnetic shielding for the electromagnetic frequencies which are typically to be shielded.

Figure 2:
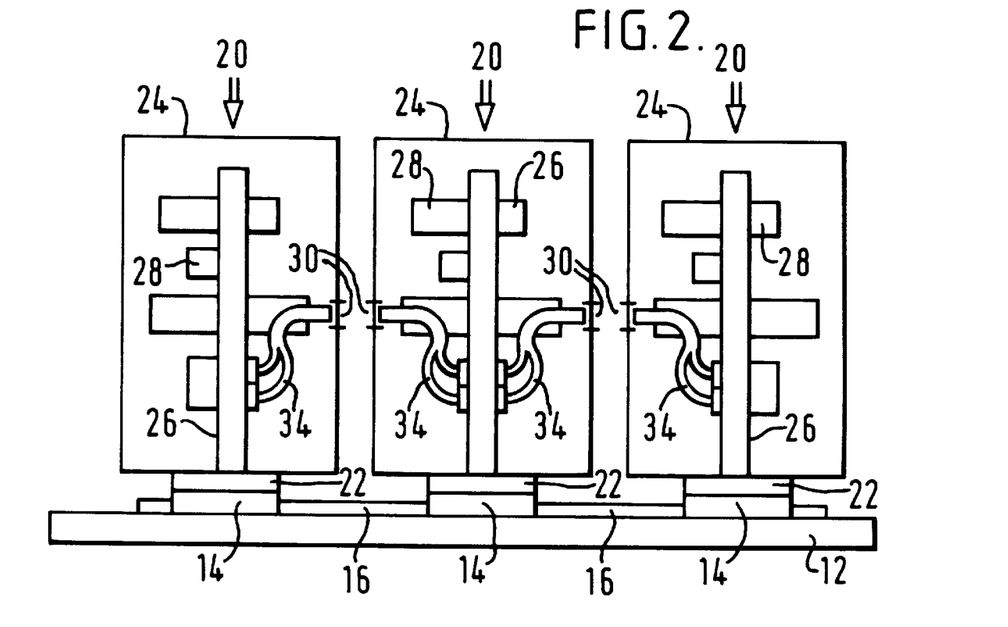
FIG. 2 is a schematic side view, partially in cross section, of a plurality of modules mounted on a backplane.

FIG. 2 is a schematic side view, partly in cross section, of the arrangement of FIG. 1. This shows the backplane 12 with the backplane connectors 14. It also shows three modules 20 mounted on the backplane connectors 14 by means of module connectors 22. As shown in FIG. 2, the module connectors 22 are connected to the end of a printed circuit board 26, on which is mounted a plurality of circuit elements 28. Although only one printed circuit board is provided, it is possible that the module will contain a number of printed circuit boards. Where the processing module is a computer processor module, the individual circuit elements will typically include a microprocessor, RISC processor or other type of processor, various memory elements, and other typical processing elements of a computer. Also shown are an optical transmitter/receiver arrangement 32/33, and an electromagnetic radiation (light) guide 34 (typically a waveguide in the form of an optical fibre or optical cable), the aperture 30 in the housing 24 of the module 20, and means (eg, 38) for mounting the light guide 34 at the aperture 30. As shown in FIG. 2, the mounting means 38 is in the form of a support for holding the light guide with respect to the printed circuit board.

It will be noted that the end modules 20 each have one optical transmitter/receiver arrangement 32/33. However, the center module 20 has two optical transmitter/receiver arrangements 32/33 including respective light guides 34. In this manner, optical communication is possible between adjacent modules 20. As will be described later, it is also possible for connections to be provided between different modules on the backplane 12, even if those modules 20 are not immediately adjacent.

It will be noted that the provision of the optical waveguides to the apertures 30 in the housing 24 means that, with suitable placing of the apertures 30 in the respective housings 24, it is possible for optical communication to be provided through free air between the individual modules once those modules have been correctly mounted on the printed circuit board 12. It is not necessary to perform some separate operation between the modules 20 in order to achieve the communication between those modules. Bearing in mind that the modules are normally very densely packed on the backplane 12, the avoidance of any need separately to make any physical connection between modules other than via the backplane is a significant advantage. Also, as only a small aperture is necessary for an optical module-to-module connection, this can be made without a negative effect on the electromagnetic shielding properties of the module housing 24.

Figure 3:
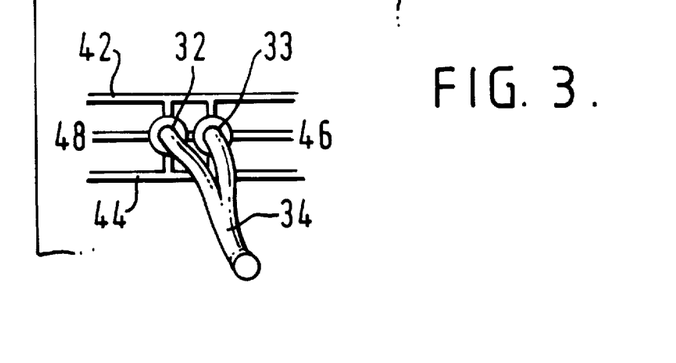
FIG. 3 is a detail of a light transmitting/receiving arrangement for an embodiment of the invention.

FIG. 3 is a schematic plan view of part of a printed circuit board 26 of a module 20. FIG. 3 shows an optical transmitter 32 and an optical receiver 33 mounted on the printed circuit board 26 and connected to the aperture 30 via a light guide 34. The optical transmitter and receiver can be implemented using any desired technology. For example, the optical transmitter 32 can be a laser diode or photodiode of any desired type capable of supporting the desired data transmission rate. For example a solid state laser diode could support a data transfer rate of the order of 2.5–10 Gigabits/second. In practice, a 100 Megabit/second transfer should be sufficient for most applications. The optical receiver 33 can be implemented using conventional photo-detector technology able to detect at the desired data rate. The actual frequency of the electromagnetic radiation used can be visible light, infra-red radiation, or electromagnetic radiation at another frequency suitable for transmitting at the desired data rate. A light guide 34 of a suitable type for the electromagnetic radiation involved can then be provided in a manner well known to the person skilled in the art. FIG. 3 also shows power supply lines 42/44 to the optical transmitter and receiver and a data line 48 for data to be transmitted by the optical transmitter 32 and a data line 46 for data received by the optical receiver 33.

Figure 4:
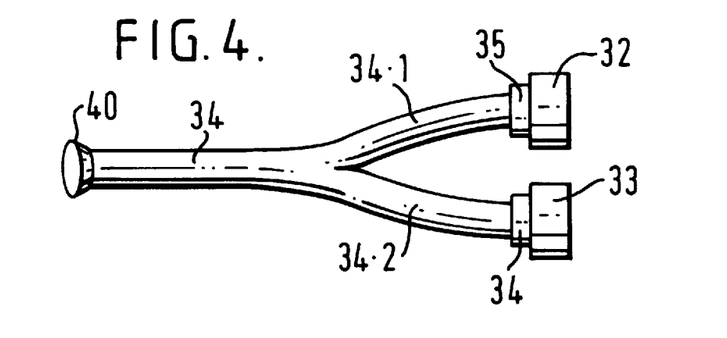
FIG. 4 is a detail of the arrangement of FIG. 3.

FIG. 4 is a schematic representation of one implementation of the waveguide 34. The waveguide 34 shown in FIG. 4 comprises an optical fibre bundle which is bifurcated to provide a first leg 34.1 for connection by means of an optical coupler 35 to the optical transmitter 32 and a second leg 34.2 for connection by means of an optical coupler 35 to the optical receiver 33. The optical coupler 35 can be of any suitable form for connecting the optical fibres of the optical cable 34 to the optical transmitter 32 and/or receiver 33. At the opposite end of the optical fibre 34, where the fibre legs are joined together to form one cable 34, a lens 40 can be provided in order to direct or alternatively to scatter the optical light as desired in order to ensure efficient light transfer between the modules 20.

Figure 5:
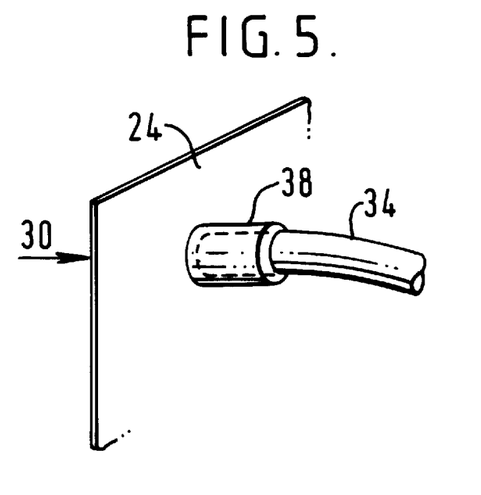
FIG. 5 is a detail of a possible mounting of a light guide for an embodiment of the invention.

FIG. 5 is a schematic representation of a possible mount for holding the optical cable at the surface of the casing (or housing) 24 of the module 20. FIG. 5 is viewed from the inside of the housing 24 so that the aperture 30 is on the reverse side of the housing 24. On the inside of the housing 24, a sleeve 38 is provided which provides a friction fit with the sheathing on the optical fibre bundle or cable 34. In this manner, easy mounting of the optical fibre within the housing 24 can be provided. If desired, additional securing means in the form of a clamp and/or adhesive materials can be employed to ensure that the optical fibre is firmly located within the sleeve 38. The sleeve 38 can be made of the same material (for example, steel or aluminium, or metallised plastic) as the housing 24. The sleeve 38 can be attached to the housing 24 by means of welding, rivets, adhesives, etc. or, in the case of a plastics housing 24, could be formed integrally with the housing 24.

Figure 6:
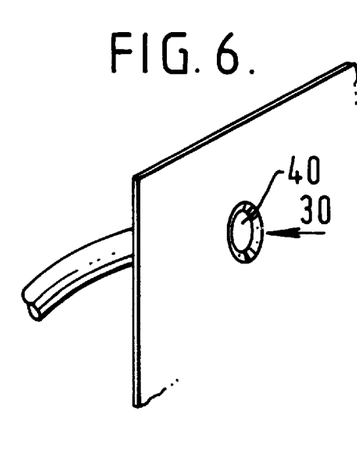
FIG. 6 is a further detail of such a mounting.

FIG. 6 shows an exterior view of the apertures 30 containing the optical fibre 34. FIG. 6 represents the provision of a lens 40 in the apertures 30 in order to provide a light beam (or light receptor) having a desired beam width and/or angle of view.

Figure 7:
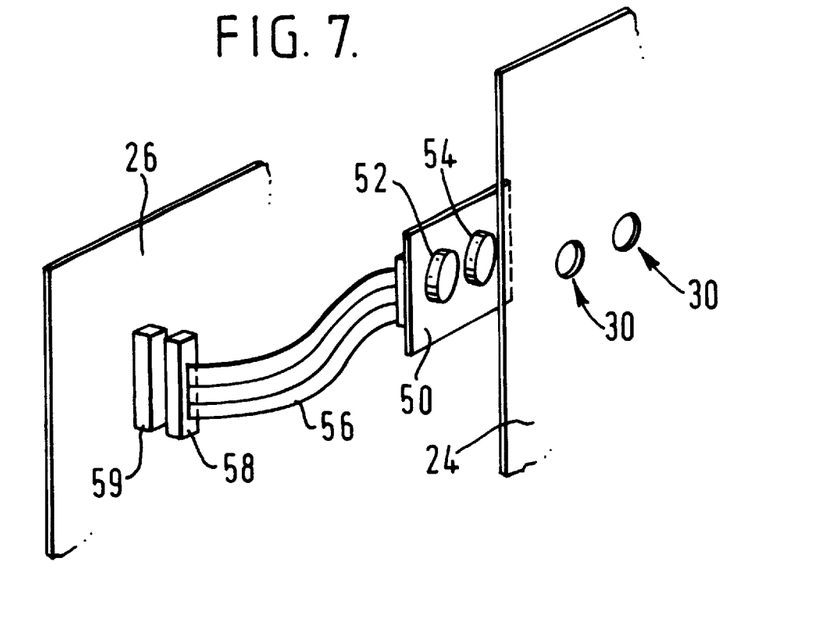
FIG. 7 is an alternative embodiment of a transmitter/receiver arrangement for an embodiment of the invention.

FIG. 7 is an alternative light transmitting/receiving element for use in a system according to FIGS. 1 and 2. In FIG. 7, rather than providing an optical transmitter 32 and optical receiver 33 on a circuit board 26 of a module 20 with a light guide 34, the arrangement provides a light transmitter 52 and light receiver 54 on a separate holder 50, possibly a printed circuit board, to be mounted in close proximity to a pair of apertures 30 in the housing 24. A support structure can be provided for the holder 50 for supporting the holder adjacent the apertures and above the printed circuit board 26, or alternatively a mounting on the housing can be provided. This latter arrangement provides for more accurate location of the optical transmitter 52 and optical receiver 54 with respective apertures in the housing 24 of the module 20. The optical transmitter 52 and optical receiver 54 can be connected to a connector 59 on the printed circuit board 26 by means of a flexible cable 56, typically a ribbon cable, and a connector 58.

Figure 8:
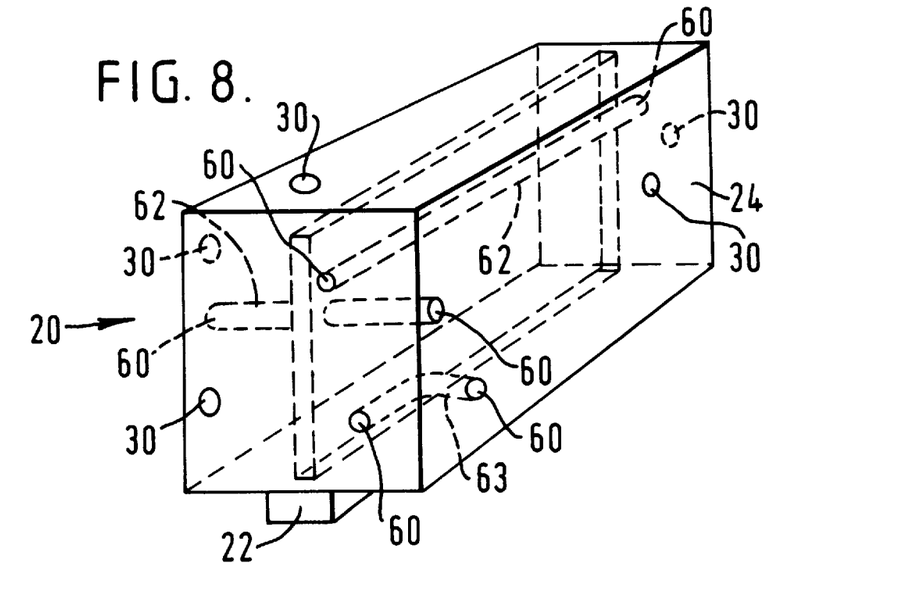
FIG. 8 is a schematic representation of a possible disposition of light transmitting and/or receiving elements for an embodiment of the invention.

As shown in FIG. 2, direct optical connection is only provided between adjacent modules. However, it is also possible to arrange for optical communication between separate processor modules which are not immediately adjacent on the backplane 12. Also, although FIGS. 1 and 2 illustrate a one-dimensional array of modules, it is possible that a two- and/or three-dimensional array of modules could be provided. To this end, apertures for optical communication can be provided in any of the faces of a module 20. FIG. 8 illustrates various possibilities. Also, to enable communication between modules which are not immediately adjacent, cooperating further apertures 60 in the housing 24 can be provided, with either a line of sight connection through air being provided internally within the module 20 between the apertures 60, or radiation wave guides (optical wave guides) 62 or 63 being provided between corresponding apertures. The optical fibres will normally extend between opposite faces of the module 20 using optical wave guides 62, or alternatively, where flexible wave guides are used, apertures on or in non-opposing faces of the module 20 may be interconnected, as represented, for example, at 63 in FIG. 8.

Figure 9:
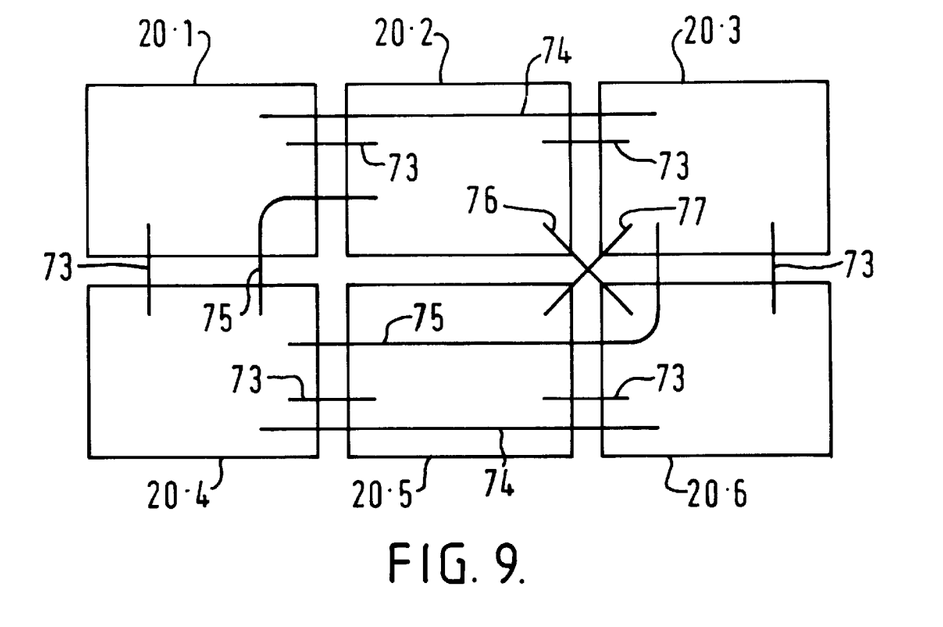
FIG. 9 is a schematic representation of an array of modules with interconnecting light transmitting/receiving elements.
Figure 10:
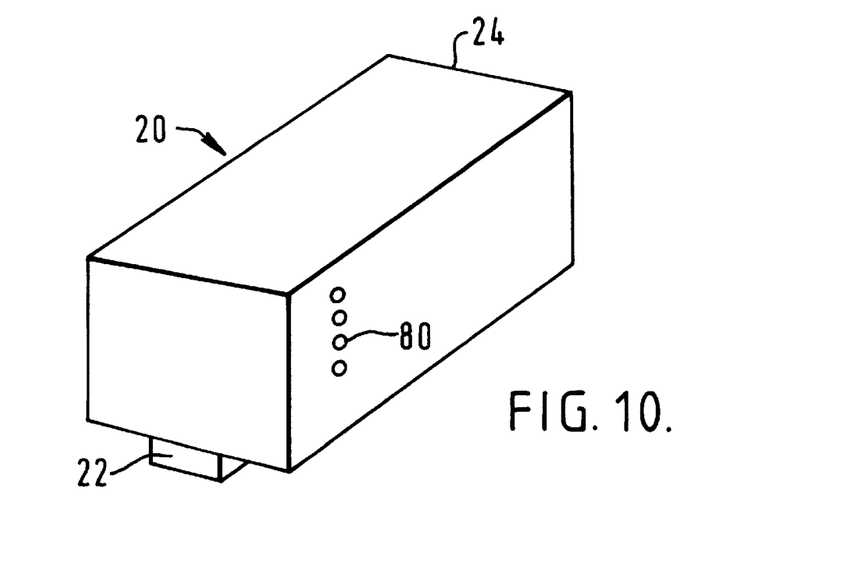
FIG. 10 is a schematic representation of a further possible embodiment of the invention.

FIG. 9 is a schematic representation of a two-dimensional array of six processor modules 20.1–20.6 showing examples of possible optical links between adjacent modules 73, between non-adjacent modules via a straight line 74 or between non-adjacent modules via a non-straight-line link 75, or diagonally between diagonally adjacent modules 76/77. In each case, the optical links are provided by separate transmitters and/or receivers in the individual modules, with transmission through free air between the modules between adjacent transmission/reception apertures and, in the case of non-adjacent modules, also via internal links (e.g., optical fibres within the modules 20, as represented in FIG. 8). In the case of the diagonal links 76 and 77 it will be noted that the transmission paths can cross one another without interference. In this case, it may be desirable to flatten the corners of the housings 24 to provide more accurate location of the optical transmitters/receivers and the corresponding apertures.

In the above described embodiments, to enable a two-way transmission between two modules, a single transmission element and a single receiver element is provided in each module. If very high data rates are required, whereby the data transmission capability of a single transmitter and/or receiver element would not suffice, it is possible to provide an array of transmitters and/or receiver elements, connected via respective apertures 80. If separate transmitter and receiver elements are provided as shown, for example, in FIG. 7, then the array of apertures 80 could include transmit and receive apertures. However, where an optical fibre is used to link transmitters and receivers to the respective apertures, then the single array of apertures 80 could provide both transmission and reception. An array of apertures can be used for very high bandwidth applications, or alternatively for relatively lower bandwidth applications where it is intended to use low cost optical transmitters and receivers.

Reference is made herein to optical transmitters and receivers and optical links. However, it should be understood that the invention is not limited to the use of visible wavelengths for optical transmission and reception, but rather more generally to electromagnetic radiation including, for example, infra-red radiation, for use in the optical transmission and/or reception.

Also, although the embodiment shows rectangular housings for the individual modules, the housings could have some other shape, for example a hexagonal shape, to enable a closer packing density of the individual modules and to allow more ready communication between a single module and a plurality of adjacent modules, with a minimising of the number of through connections across modules which would be necessary.

Further, in the above embodiments, it has been assumed that the optical transmission arrangements are in addition to the electrical transmission arrangements via the backplane. However, in a further embodiment of the invention, all data and control communication could be via the optical transmission links, the remaining connectors being provided merely for power supply to the individual modules, and/or for analogue voltage levels, for example.

Although reference has also been made to a specific embodiment of the invention where a single-sided backplane 12 is used, a backplane having modules mounted on both sides of the backplane could be used. In this case, holes in the backplane would be provided for optical transmission in a direction through the backplane between optical transmitter/receiver apertures on the faces of the housing having the module connectors (i.e. in a vertical direction through the backplane 12 in FIG. 2).

Also, a backplane structure could be replaced by an alternative support structure for maintaining the modules in a close arrangement. In such a case, the support structure could involve means for physically interconnecting modules and could include means for providing electrical connections between the individual modules (for example, for power supply purposes) with substantially all communication between the modules being by optical links. Also, the support structure could provide a grid or matrix type arrangement whereby a three-dimensional array of modules is provided.

Further, although in the preferred embodiment of the invention, the individual modules 20 will comprise housing 24, preferably able to shield electromagnetic radiation, the invention is not limited to modules including such housings, or casings. Also, for embodiments where the individual modules are provided with housings, the apertures 30 could be simple holes in the housing, or could be an area of the housing, for example where the housing is made of a plastics material, where no metalisation of the housing is provided and simply a translucent or transparent region is provided in the housing.

Although particular embodiments of the invention have been described, it will be appreciated that the invention is not limited thereto, and many modifications and/or additions may be made within the spirit and scope of the invention as defined in the appended claims. For example, different combinations of the features of the dependent claims may be combined with the features of any of the independent claims.

What is claimed is:

1. A processing system comprising a mechanical support structure and a plurality of processing modules, wherein each processing module comprises:
    a module connector for mounting said processing module with respect to said support structure;
    at least one optical transceiver for providing an optical data link between said processing module and a further processing module mounted with respect to said mechanical support structure; and
    a housing providing electromagnetic shielding, an aperture being provided in said housing for said optical data link.

2. A processing system according to claim 1, wherein each of said processing modules is a replaceable unit.

3. A processing system according to claim 1, wherein said aperture is located such that the apertures in the housing of said processing modules are aligned with each other when at least two of said processing modules are mounted on said support structure.

4. A processing system according to claim 3, wherein each of said processing modules is provided with an optical through-link such that an optical link can be established between non-adjacent processing modules on said support structure.

5. A processing system according to claim 1, wherein said optical transceiver of said processing module is directly aligned for providing an optical link with an optical transceiver of another said processing module.

6. A processing system according to claim 1, wherein each of said processing modules comprises an optical fibre having one end aligned for providing an optical link with another said processing module and another end aligned with said optical transceiver.

7. A processing system according to claim 1, wherein each of said processing modules comprises an optical fibre having one end aligned for providing an optical link with another said processing module, said other end being split, with one part thereof aligned with an optical transmitter and another part thereof aligned with an optical receiver.

8. A processing system according to claim 1, further comprising electrically linked support connectors on said support structure, said module connector providing electrical connections to said support connector when connected thereto, whereby said optical data link between processing modules mounted on said support structure is in addition to electrical data links provided via said processing module and said support connectors.

9. A processing system according to claim 8, wherein said support structure is a backplane.

10. A processing system comprising:
a backplane including a plurality of backplane electrical connectors for an array of processing modules and electrical links between said backplane electrical connectors;
and a plurality of replaceable processing modules mountable on said backplane, wherein each processing module comprises:
a processing module electrical connector connectable to said backplane electrical connector when said processing module is mounted on said backplane;
a plurality of electronic processing components on at least one circuit board; and
a bidirectional optical interface for providing an optical data link between said processing module and a further processing module mounted on said backplane.

11. A processing system according to claim 10, wherein said bi-directional optical interface is located such that optical interfaces of respective processing modules when mounted on said backplane are aligned with each other.

12. A processing system according to claim 11, wherein said bi-directional optical interface is configured to permit optical data transmission between said processing module and a further processing module through free air between said processing modules.

13. A processing system according to claim 11, wherein each of said processing modules comprises a housing providing electromagnetic shielding, an aperture being provided in said electromagnetic shielding for said optical data link, said aperture being located such that apertures of respective processing modules when mounted on said backplane are aligned with each other and such that said bidirectional optical interfaces of respective processing modules, when mounted on said backplane, are aligned with each other.

14. A processing system according to claim 13, wherein each of said processing modules is provided with an optical through-link such that an optical link can be established between non-adjacent processing modules on said backplane.

15. A processing system according to claim 10, wherein said bidirectional optical interface of a said processing module comprises an optical transceiver directly aligned for providing an optical link with a bidirectional optical interface of another said processing module.

16. A processing system according to claim 10, wherein said bidirectional optical interface comprises an optical transceiver and an optical waveguide, said optical waveguide having one end aligned for providing an optical link with another said processing module and another end aligned with said optical transceiver.

17. A processing system according to claim 10, wherein each of said processing modules comprises an optical transmitter, a first optical fibre having one end aligned for providing an optical link with another said processing module and another end aligned with said optical transmitter, an optical receiver and a further optical fibre having one end aligned for providing an optical link with another said processing module and another end aligned with said optical receiver.

18. A processing system according to claim 10, wherein said optical data link between processing modules mounted on said backplane is in addition to electrical data links via said processing module and said backplane electrical connectors.

19. A processing system according to claim 10, wherein said processing system is a fault-tolerant multi-processor system, each module comprising a processing module for said fault tolerant multi-processor system.

20. A replaceable processing module for a multiple processing module processing system, said processing module comprising:
an electrical connector connectable to a corresponding backplane electrical connector on a backplane of said processing system;
a plurality of electronic processing components on at least one circuit board;
and
a bidirectional optical interface for providing an optical data link between said processing module and a further processing module mounted on said backplane.

21. A processing module according to claim 20, wherein said bi-directional optical interface is located such that optical interfaces of respective processing modules when mounted on said backplane are aligned with each other.

22. A processing module according to claim 21, wherein said bidirectional optical interface is configured to permit optical data transmission between said processing module and a further processing module through free air between said processing modules.

23. A processing module according to claim 22, wherein said processing module comprises a housing providing electromagnetic shielding, an aperture being provided in said electromagnetic shielding for said optical data link, said aperture being located such that apertures of respective processing modules when mounted on said backplane are aligned with each other and such that said bidirectional optical interfaces of respective processing modules, when mounted on said backplane, are aligned with each other.

24. A processing module according to claim 23, wherein said processing module is provided with an optical through-link such that an optical link can be established between non-adjacent processing modules on said support structure.

25. A processing module according to claim 24, wherein said bidirectional optical interface of said processing module comprises an optical transceiver directly aligned for providing an optical link with a bidirectional optical interface of another said processing module.

26. A processing module according to claim 21, wherein said bidirectional optical interface comprises an optical transceiver and an optical waveguide, said optical waveguide having one end aligned for providing an optical link with another said processing module and another end aligned with said optical transceiver.

27. A processing module according to claim 21, wherein said processing module comprises an optical transmitter, a first optical fibre having one end aligned for providing an optical link with another said processing module and another end aligned with said optical transmitter, an optical receiver and a further optical fibre having one end aligned for providing an optical link with another said processing module and another end aligned with said optical receiver.

28. A processing module according to claim 27, wherein said optical data link between processing modules mounted on said support structure is in addition to electrical data links via said processing modules and backplane electrical connectors.

29. A processing module according to claim 28, wherein said processing module is for a fault tolerant multi-processor system.

30. A method of communicating between electromagnetically shielded processing modules of a multi-processor system having a plurality of processing modules and a mechanical support structure for mounting said processing modules, wherein said method comprises:

mounting a plurality of processing modules by means of said mechanical support structure; and conducting data communication between said processing modules via an optical data link between at least two of said processing modules through apertures in the electromagnetic shielding of said processing modules.

31. A method according to claim 30, wherein said multi-processor system is a fault tolerant computer system.

32. A method according to claim 30, wherein said data communication is also conducted via electrical connections and said support structure.

33. A method according to claim 32, wherein said support structure is a backplane.

* * * * *